United States Patent
Perry et al.

(10) Patent No.: US 12,184,110 B2
(45) Date of Patent: Dec. 31, 2024

(54) POWER SUPPLY ARCHITECTURE WITH BIDIRECTIONAL BATTERY IDEALIZATION

(71) Applicant: Cirrus Logic International Semiconductor Ltd., Edinburgh (GB)

(72) Inventors: Ivan Perry, Penicuik (GB); Hasnain Akram, Austin, TX (US); Eric J. King, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/503,830

(22) Filed: Nov. 7, 2023

(65) Prior Publication Data

US 2024/0072559 A1    Feb. 29, 2024

Related U.S. Application Data

(63) Continuation of application No. 17/377,513, filed on Jul. 16, 2021, now Pat. No. 11,855,471.

(60) Provisional application No. 63/148,352, filed on Feb. 11, 2021, provisional application No. 63/065,759, filed on Aug. 14, 2020.

(51) Int. Cl.
*H02J 7/00* (2006.01)

(52) U.S. Cl.
CPC .......... *H02J 7/0068* (2013.01); *H02J 7/0063* (2013.01); *H02J 2207/20* (2020.01); *H02J 2310/22* (2020.01)

(58) Field of Classification Search
USPC .................... 320/106, 107, 108, 109, 110
See application file for complete search history.

(56) References Cited

U.S. PATENT DOCUMENTS

| | | | |
|---|---|---|---|
| 5,248,524 | A | 9/1993 | Soderlund |
| 5,617,016 | A | 4/1997 | Borghi et al. |
| 5,757,167 | A | 5/1998 | Arora et al. |
| 6,177,783 | B1 | 6/2001 | Donohue |

(Continued)

FOREIGN PATENT DOCUMENTS

| | | | |
|---|---|---|---|
| CN | 106685039 A | * | 5/2017 |
| CN | 110784140 A | | 2/2020 |

(Continued)

OTHER PUBLICATIONS

Stmicroelectronics NV, AN4218—Hardware design guideline power supply and voltage measurement—Application Note, Doc ID 024014 Rev 3, 26 pages, Oct. 2015.

(Continued)

*Primary Examiner* — Brian Ngo
(74) *Attorney, Agent, or Firm* — Jackson Walker L.L.P.

(57) ABSTRACT

A power management system for use in a device comprising a battery and one or more components configured to draw electrical energy from the battery may include a first power converter configured to electrically couple between charging circuitry configured to provide electrical energy for charging the battery and the one or more downstream components and a bidirectional power converter configured to electrically couple between the charging circuitry and the battery, wherein the bidirectional power converter is configured to transfer charge from the battery or transfer charge from the battery based on a power requirement of the one or more components and a power available from the first power converter.

10 Claims, 4 Drawing Sheets

(56) References Cited

U.S. PATENT DOCUMENTS

| | | |
|---|---|---|
| 6,597,158 B2 | 7/2003 | Umeda |
| 7,102,340 B1 | 9/2006 | Ferguson |
| 7,190,150 B2 | 3/2007 | Chen et al. |
| 7,906,939 B2 | 3/2011 | Kung et al. |
| 9,088,247 B2 | 7/2015 | Arno et al. |
| 9,577,587 B2 | 2/2017 | Maru et al. |
| 9,639,102 B2 | 5/2017 | Dally |
| 9,742,393 B2 | 8/2017 | Pavao-Moreira et al. |
| 10,263,523 B1 | 4/2019 | Sonntag et al. |
| 10,476,392 B1 | 11/2019 | Matsuura et al. |
| 10,673,423 B2 | 6/2020 | Forghani-Zadeh et al. |
| 10,720,835 B2 | 7/2020 | King et al. |
| 10,734,885 B2 | 8/2020 | King et al. |
| 2001/0020802 A1 | 9/2001 | Kitagawa et al. |
| 2005/0264268 A1 | 12/2005 | Ueno |
| 2006/0139819 A1 | 6/2006 | May |
| 2008/0129219 A1 | 6/2008 | Smith et al. |
| 2008/0278136 A1 | 11/2008 | Murtojarvi |
| 2009/0266397 A1 | 10/2009 | Gibson et al. |
| 2010/0019702 A1 | 1/2010 | Jang et al. |
| 2010/0156175 A1 | 6/2010 | Wei |
| 2011/0075446 A1 | 3/2011 | Doutreloigne et al. |
| 2011/0121653 A1 | 5/2011 | Hartular et al. |
| 2012/0205974 A1 | 8/2012 | McCaslin et al. |
| 2012/0268094 A1 | 10/2012 | Scaldaferri et al. |
| 2013/0106188 A1 | 5/2013 | Ishibashi et al. |
| 2014/0197814 A1 | 7/2014 | Shi et al. |
| 2016/0064986 A1 | 3/2016 | Langlinais et al. |
| 2017/0005647 A1 | 1/2017 | Pan et al. |
| 2017/0072812 A1 | 3/2017 | Von Novak et al. |
| 2019/0181754 A1 | 6/2019 | Ash et al. |
| 2019/0245444 A1 | 8/2019 | Kimura |
| 2020/0235712 A1 | 7/2020 | May et al. |
| 2021/0083578 A1 | 3/2021 | King et al. |
| 2021/0159798 A1 | 5/2021 | Mackay et al. |
| 2021/0364560 A1 | 11/2021 | Holland et al. |
| 2021/0367510 A1 | 11/2021 | Lawrence et al. |
| 2021/0367513 A1 | 11/2021 | Mackay et al. |
| 2021/0367514 A1 | 11/2021 | Lawrence et al. |
| 2021/0367515 A1 | 11/2021 | Mackay et al. |
| 2021/0367517 A1 | 11/2021 | Lawrence et al. |

FOREIGN PATENT DOCUMENTS

| | | |
|---|---|---|
| EP | 2775599 A1 | 9/2014 |
| EP | 3214746 A1 | 9/2017 |
| EP | 3240171 A1 | 11/2017 |
| FR | 2851091 A1 | 8/2004 |
| GB | 2555902 A | 5/2018 |
| TW | 201228201 A | 7/2012 |
| WO | 2012135778 A1 | 10/2012 |
| WO | 2017027393 A1 | 2/2017 |
| WO | 2019135820 A1 | 7/2019 |

OTHER PUBLICATIONS

Freescale Semiconductor, Inc., Multimedia Applications Division, i.MX233 Power Management Unit and Battery Charger—Application Note, Document No. AN3883, Rev. 0, 36 pages, Jul. 2009.

Texas Instruments, TPS6128x Low-, Wide- Voltage Battery Front-End DC/DC Converter Single-Cell Li-Ion, Ni-Rich, Si-Anode Applications—Data sheet, SLVSBI1A, 57 pages, Oct. 2013, Revised Sep. 2014.

Texas Instruments, Designing Robust TPS65217 Systems for VIN Brownout—Application Report, 13 pages, Oct. 2017.

Renesas Electronics Corporation, Preventing Subsystem Brownouts in Mobile Devices—White Paper, 6 pages.

MFJ Enterprises, Inc., MFJ—Super Battery Booster—Model MFJ-4416C—Instruction Manual, Version 0A, 16 pages, 2017.

International Search Report and Written Opinion of the International Searching Authority, International Application No. PCT/US2020/056782, mailed Mar. 4, 2021.

Van Vroonhoven, Caspar, A 0-to-60V-Input Vcm Coulomb Counter with Signal-Dependent Supply Current and ±0.5% Gain Inaccuracy from -50° C. to 125° C., 2020 IEEE International Solid-State Circuits Conference, Feb. 19, 2020.

International Search Report and Written Opinion of the International Searching Authority, International Application No. PCT/US2021/029631, mailed Jul. 23, 2021.

Qiu et al., "Digital Average Current-Mode Control of PWM DC-DC Converts without Current Sensors", IEEE Transactions On Industrial Electronics, IEEE Service Center, vol. 57, No. 5, May 10, 2010, Piscataway, NJ, USA.

International Search Report and Written Opinion of the International Searching Authority, International Application No. PCT/US2021/029584, mailed Jul. 30, 2021.

International Search Report and Written Opinion of the International Searching Authority, International Application No. PCT/US2021/032474, mailed Aug. 3, 2021.

Vinnikov et al., "Solar Optiverter-A Novel Hybrid Approach to the PHotovoltaic Module Level Power Electronics", IEEE Transactions On Industrial Electronics, IEEE Service Center, vol. 66, No. 5, May 1, 2019, pp. 3869-3880, Piscataway, NJ, USA.

International Search Report and Written Opinion of the International Searching Authority, International Application No. PCT/US2021/032496, mailed Aug. 4, 2021.

International Search Report and Written Opinion of the International Searching Authority, International Application No. PCT/US2021/030932, mailed Aug. 20, 2021.

International Search Report and Written Opinion of the International Searching Authority, International Application No. PCT/US2021/039356, mailed Oct. 1, 2021.

International Search Report and Written Opinion of the International Searching Authority, International Application No. PCT/US2020/047237, mailed Oct. 30, 2020.

Stala, Robert et al., "A Switched-Capacitor DC-DC Converter with Variable Number of Voltage Gains and Fault-Tolerant Operation", IEEE Transactions On Industrial Electronics, IEEE Service Center, Piscataway, NJ, US, vol. 66, No. 5, May 1, 2019.

International Search Report and Written Opinion of the International Searching Authority, International Application No. PCT/US2020/039509, mailed Oct. 8, 2021.

International Search Report and Written Opinion of the International Searching Authority, International Application No. PCT/US2020/041535, mailed Oct. 14, 2021.

International Search Report and Written Opinion of the International Searching Authority, International Application No. PCT/US2021/039373, mailed Sep. 22, 2021.

Yu, Yangwei: "Choosing the Boost with Bypass or Pass Through", Jun. 30, 2017, Retrieved from the Internet Sep. 10, 2021.

Texas Instruments: TPS61291 Loe IQ Boost Converter with Bypass Operation, Sep. 30, 2014, Retrieved from the Internet Sep. 10, 2021.

Search Report under Section 17, UKIPO, Application No. GB2106142.9, mailed Oct. 20, 2021.

Combined Search and Examination Report under Sections 17 and 18(3), UKIPO, Application No. GB2106144.5, mailed Oct. 25, 2021.

International Search Report and Written Opinion of the International Searching Authority, International Application No. PCT/US2021/041547, mailed Nov. 2, 2021.

International Search Report and Written Opinion of the International Searching Authority, International Application No. PCT/US2021/041918, mailed Nov. 10, 2021.

International Search Report and Written Opinion of the International Searching Authority, International Application No. PCT/US2021/041544, mailed Nov. 10, 2021.

* cited by examiner

POWER SUPPLY ARCHITECTURE WITH BIDIRECTIONAL BATTERY IDEALIZATION

RELATED APPLICATIONS

The present disclosure is a continuation of U.S. Nonprovisional patent application Ser. No. 17/377,513, filed Jul. 16, 2021, which claims priority to U.S. Provisional Patent Application Ser. No. 63/065,759, filed Aug. 14, 2020, and U.S. Provisional Patent Application Ser. No. 63/148,352, filed Feb. 11, 2021, each of which are incorporated by reference herein in their entirety.

FIELD OF DISCLOSURE

The present disclosure relates in general to circuits for electronic devices, including without limitation personal audio devices such as wireless telephones and media players, and more specifically, a power supply architecture with bidirectional battery idealization.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include circuitry for implementing a boost converter for converting a battery voltage (e.g., provided by a lithium-ion battery) into a supply voltage delivered to one or more components of the portable electronic device. The power delivery network may also regulate such supply voltage, and isolate the downstream loads of these one or more devices from fluctuation in an output voltage of the battery over the course of operation.

SUMMARY

In accordance with the teachings of the present disclosure, one or more disadvantages and problems associated with existing approaches to power supply architectures may be reduced or eliminated.

In accordance with embodiments of the present disclosure, a power management system for use in a device comprising a battery and one or more components configured to draw electrical energy from the battery may include a first power converter configured to electrically couple between charging circuitry configured to provide electrical energy for charging the battery and the one or more downstream components, and a bidirectional power converter configured to electrically couple between the charging circuitry and the battery, wherein the bidirectional power converter is configured to transfer charge from the battery or transfer charge from the battery based on a power requirement of the one or more components and a power available from the first power converter.

In accordance with these and other embodiments of the present disclosure, a method may include, in a device comprising a battery and one or more components configured to draw electrical energy from the battery receiving electrical energy from charging circuitry configured to provide electrical energy for charging the battery at a first power converter configured to electrically couple between the charging circuitry and the one or more downstream components. The method may also include transferring charge from the battery or transferring charge from the battery, by a bidirectional power converter configured to electrically couple between the charging circuitry and the battery, based on a power requirement of the one or more components and a power available from the first power converter.

In accordance with these and other embodiments of the present disclosure, a method may include, a device may include a battery, one or more components configured to draw electrical energy from the battery, and a power management system. The power management system may include a first power converter configured to electrically couple between charging circuitry configured to provide electrical energy for charging the battery and the one or more downstream components, and a bidirectional power converter configured to electrically couple between the charging circuitry and the battery, wherein the bidirectional power converter is configured to transfer charge from the battery or transfer charge from the battery based on a power requirement of the one or more components and a power available from the first power converter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
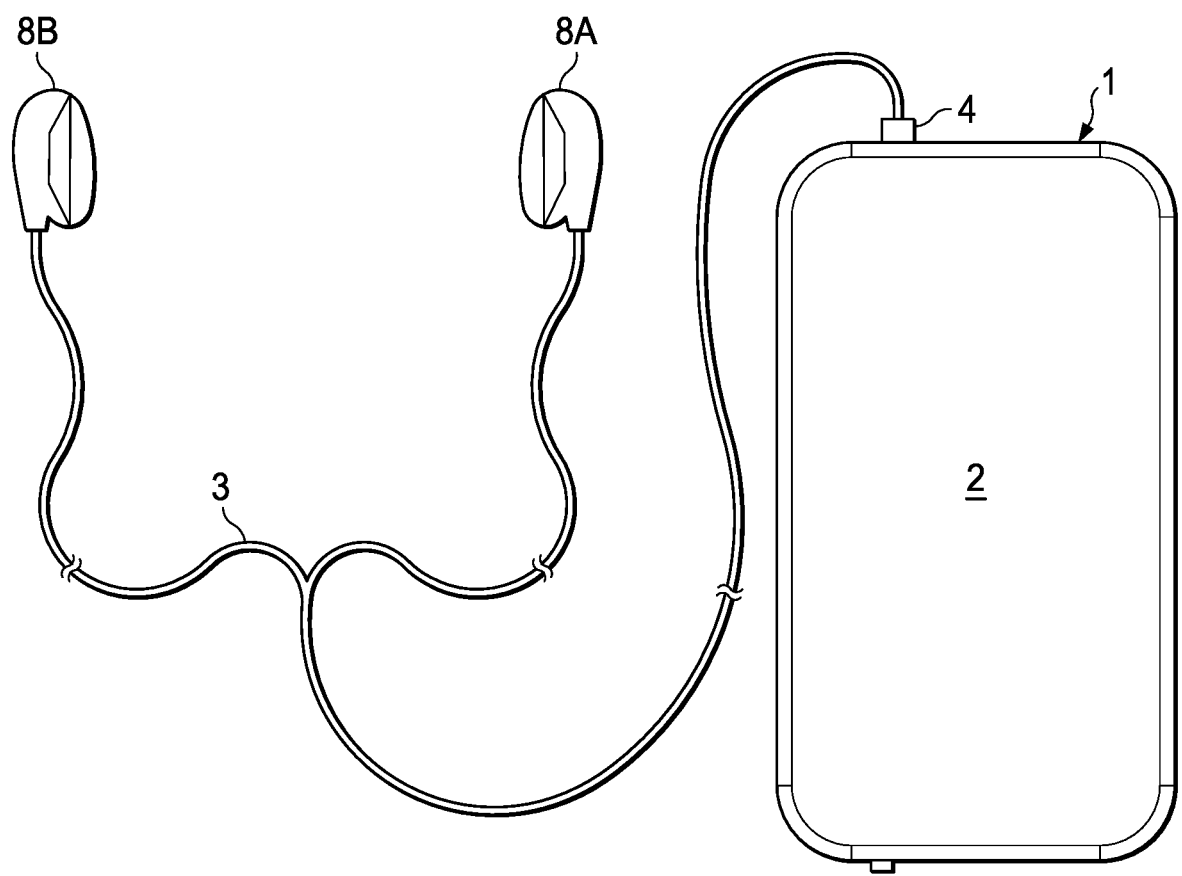
FIG. 1 illustrates an example portable electronic device, in accordance with embodiments of the present disclosure.

FIG. 1 illustrates an example portable electronic device 1, in accordance with embodiments of the present disclosure. FIG. 1 depicts portable electronic device 1 coupled to a headset 3 in the form of a pair of earbud speakers 8A and 8B. Headset 3 depicted in FIG. 1 is merely an example, and it is understood that portable electronic device 1 may be used in connection with a variety of audio transducers, including without limitation, headphones, earbuds, in-ear earphones, and external speakers. A plug 4 may provide for connection of headset 3 to an electrical terminal of portable electronic device 1. Portable electronic device 1 may provide a display to a user and receive user input using a touch screen 2, or alternatively, a standard liquid crystal display (LCD) may be combined with various buttons, sliders, and/or dials disposed on the face and/or sides of portable electronic device 1.

Figure 2:
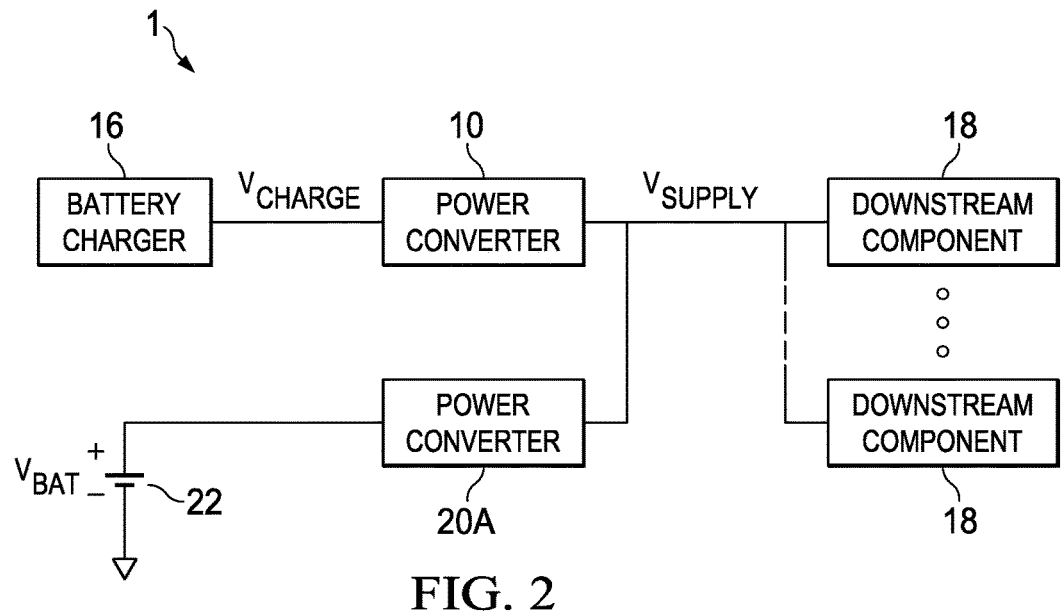
FIG. 2 illustrates a block diagram of selected components internal to a portable electronic device, in accordance with embodiments of the present disclosure.

FIG. 2 illustrates a block diagram of selected components integral to portable electronic device 1, in accordance with embodiments of the present disclosure. As shown in FIG. 2, portable electronic device 1 may include a battery charger 16, a power converter 10, a battery 22, a power converter 20A, and one or more downstream components 18.

Battery charger 16 may include any system, device, or apparatus configured to charge a battery, for example by delivering electrical energy to a battery in order that such battery converts the electrical energy to chemical energy that is stored in such battery. In some embodiments, battery charger 16 may include a wired charger configured to draw electrical energy from an electrical power outlet or from a power bank. In other embodiments, battery charger 16 may include a wireless charger configured to draw electrical energy via inductive coupling from a wireless charging pad or similar device. In some embodiments, a portable electronic device 1 may include both a wired charger and a wireless charger.

Power converter 10 may include any system, device, or apparatus configured to receive a charger voltage $V_{CHARGE}$ (e.g., 5 volts, 9 volts, 20 volts) output by battery charger convert such charger voltage $V_{CHARGE}$ into a supply voltage $V_{SUPPLY}$ (e.g., 5 volts). In some embodiments, power converter 10 may comprise a buck converter that may convert charger voltage $V_{CHARGE}$ into supply voltage $V_{SUPPLY}$ equal to or less than charger voltage $V_{CHARGE}$ In these and other embodiments, power converter 10 may comprise a capacitive power converter or "charge pump." In other embodiments, power converter 10 may comprise an inductor-based power converter.

Battery 22 may include any system, device, or apparatus configured to convert chemical energy stored within battery 22 to electrical energy for powering downstream components 18 of portable electronic device 1. Further, battery 22 may also be configured to recharge, in which it may convert electrical energy received by battery 22 into chemical energy to be stored for later conversion back into electrical energy. For example, in some embodiments, battery 22 may comprise a lithium-ion battery.

Power converter 20A may include any system, device, or apparatus configured to operate in a boost mode to receive battery voltage $V_{BAT}$ generated by battery 22 and convert such battery voltage $V_{BAT}$ into supply voltage $V_{SUPPLY}$ greater than or equal to battery voltage $V_{BAT}$. In addition, as described in greater detail below, power converter 20A may also operate bidirectionally, including a buck mode in which power converter 20A may convert supply voltage $V_{SUPPLY}$ into battery voltage $V_{BAT}$ lesser than or equal to supply voltage $V_{SUPPLY}$ in order to recharge battery 22.

Downstream components 18 of portable electronic device 1 may include any suitable functional circuits or devices of portable electronic device 1, including without limitation processors, audio coder/decoders, amplifiers, display devices, etc. As shown in FIG. 2, downstream components 18 may be powered from supply voltage $V_{SUPPLY}$ generated by either or both of power converter 10 and power converter 20A.

Figure 3:
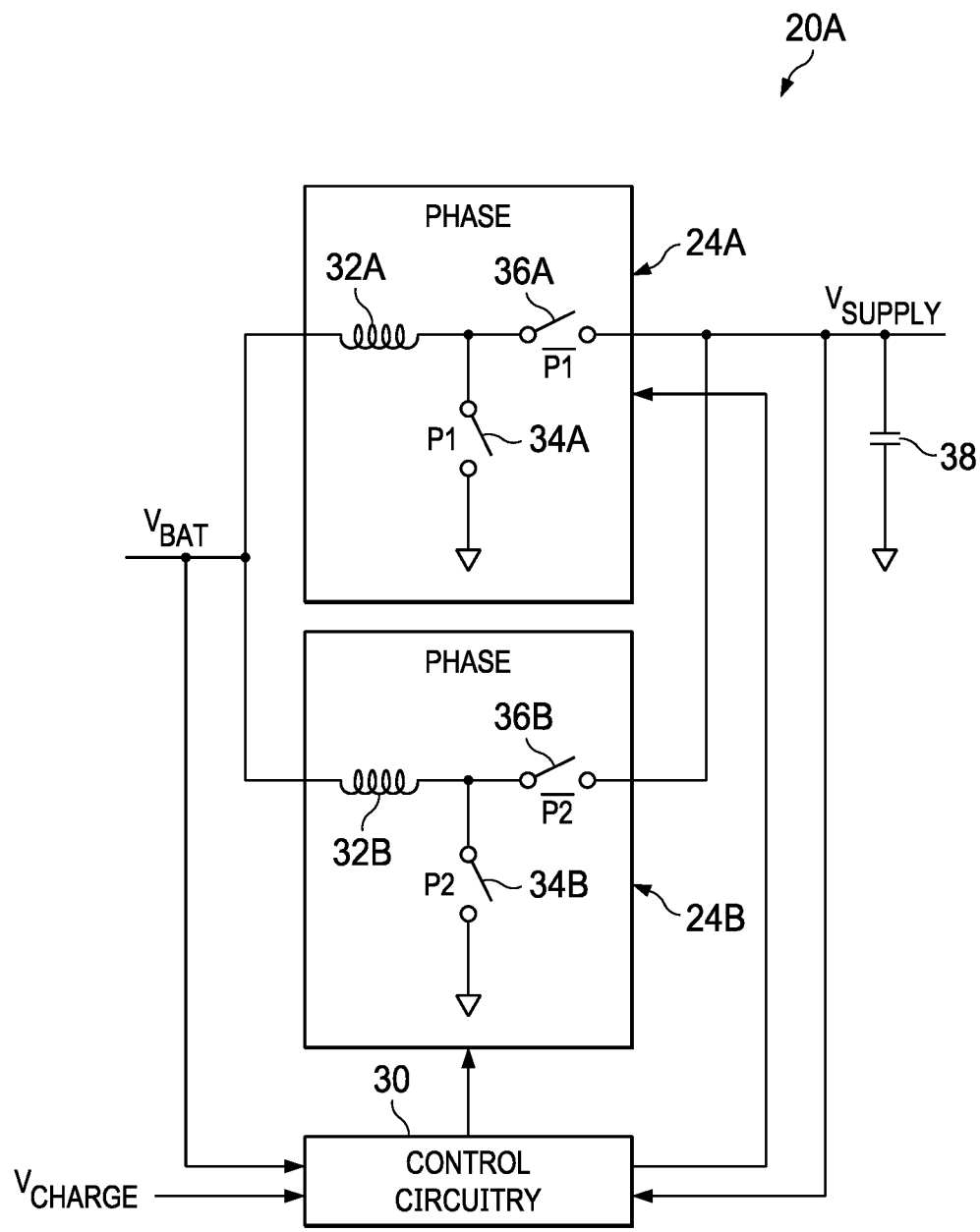
FIG. 3 illustrates a block diagram of selected components of an example power converter, in accordance with embodiments of the present disclosure.

FIG. 3 illustrates a block diagram of selected components of an example power converter 20A, in accordance with embodiments of the present disclosure. Power converter 20A may be used to implement power converter 20A depicted in FIG. 2.

As shown in FIG. 3, power converter 20A may include a plurality of inductive phases 24 (e.g., phases 24A and 24B). As shown in FIG. 3, each inductive phase 24 may include a power inductor 32, a first switch 34, and a second switch 36. Although FIG. 3 depicts only two inductive phases 24 for the purposes of clarity and exposition, in some embodiments, power converter 20A may have a single inductive phase 24 or may have more than two inductive phases 24.

In operation in a boost mode, control circuitry 30 may periodically commutate first switches 34 (e.g., during a charging state of an inductive phase 24) and second switches 36 (e.g., during a transfer state of an inductive phase 24) of an inductive phase 24 by generating appropriate control signals $P_1$, $\overline{P}_1$, $P_2$, and $\overline{P}_2$, to boost battery voltage $V_{BAT}$ to a higher supply voltage $V_{SUPPLY}$ at output capacitor 38 in order to regulate supply voltage $V_{SUPPLY}$ at a desired voltage level.

In addition, in operation in a buck mode, control circuitry 30 may periodically commutate second switches 36 (e.g., during a charging state of an inductive phase 24) and first switches 34 (e.g., during a transfer state of an inductive phase 24) of an inductive phase 24 by generating appropriate control signals $P_1$, $\overline{P}_1$, $P_2$, and $\overline{P}_2$, to buck supply voltage $V_{SUPPLY}$ to a lower battery voltage $V_{BAT}$ in order to charge a battery (e.g. battery 22) regulate supply voltage $V_{SUPPLY}$ at a desired voltage level.

Accordingly, control circuitry 30 may sense charger voltage $V_{CHARGE}$, battery voltage $V_{BAT}$, supply voltage $V_{SUPPLY}$, and/or another suitable parameter associated with portable electronic device 1 and based thereon, determine in which mode it is to operate, and then operate in such mode. For example, when power available from battery charger 16 and power converter 10 is in excess of a power demanded by downstream components 18, control circuitry 30 may operate power converter 20A in the buck mode to deliver such excess power to battery 22. As another example, when power available from battery charger 16 and power converter 10 is insufficient to supply the power demanded by downstream components 18, control circuitry 30 may operate power converter 20A in the boost mode to draw power from battery 22.

Using such a power supply architecture such as that described above, in which an output of a charger path (e.g., battery charger 16 and power converter 10) is coupled to supply voltage $V_{SUPPLY}$, power converter 20A may boost to downstream components 18 during discharge of battery 22 and buck to battery 22 during charging of battery 22. The flexibility of placing bidirectional power converter 20A between the electrical nodes for supply voltage $V_{SUPPLY}$ and battery voltage $V_{BAT}$ as described above is that it may provide an ideal fixed voltage of supply voltage $V_{SUPPLY}$ for both downstream components 18 and for the charger path (e.g., battery charger 16 and power converter 10), thus presenting an idealized version of battery behavior to both downstream components 18 and the charger path. Because power converter 20A may idealize battery 22 both during charging and discharge, power converter 20A may be able to handle power distribution in complex scenarios such as that which may occur when power demanded by downstream components 18 exceeds that available from the charger path.

Figure 4:
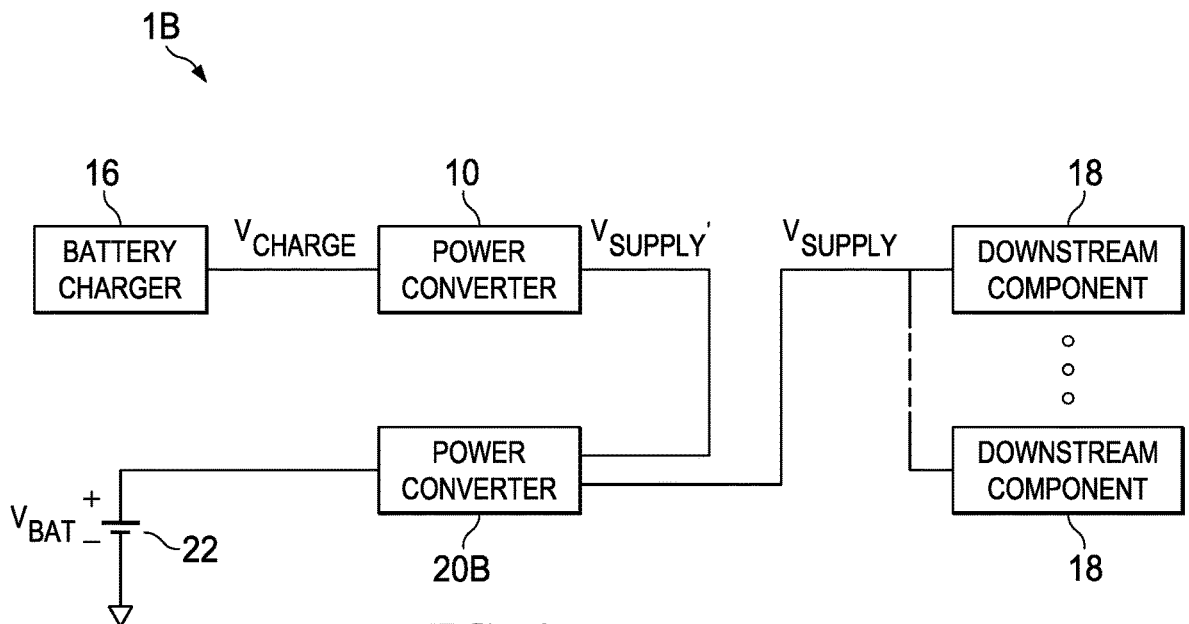
FIG. 4 illustrates a block diagram of selected components internal to a portable electronic device in an alternate embodiment of a portable electronic device, in accordance with embodiments of the present disclosure.

FIG. 4 illustrates a block diagram of selected components internal to portable electronic device 1 in an alternate embodiment 1B of portable electronic device 1, in accordance with embodiments of the present disclosure. In alternate embodiment 1B, instead of power converter 10 directly generating supply voltage $V_{SUPPLY}$, power converter may generate intermediate supply voltage $V_{SUPPLY}'$, which may be received by power converter 20B as an input. Also as shown in FIG. 4, power converter 20B may be used in lieu of power converter 20A.

Figure 5:
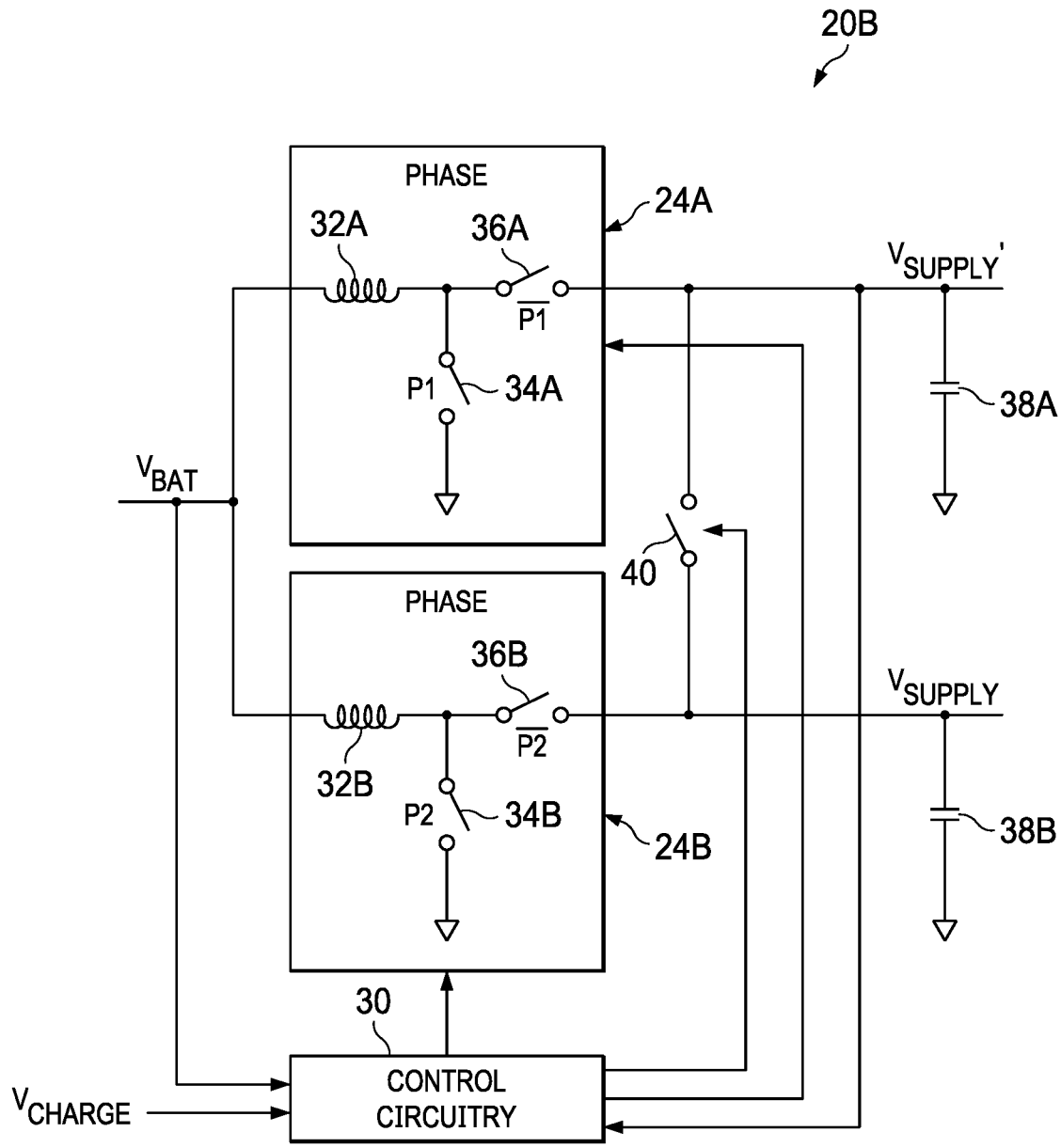
FIG. 5 illustrates a block diagram of selected components of another example power converter, in accordance with embodiments of the present disclosure.

FIG. 5 illustrates a block diagram of selected components of example power converter 20B, in accordance with embodiments of the present disclosure. Power converter 20B may be similar in many respects to power converter 20A, except that in power converter 20B, the node for intermediate supply voltage $V_{SUPPLY}'$ may be coupled to the boost output of at least one inductive phase 24A, the node for supply voltage $V_{SUPPLY}$ may be coupled to the boost output of at least one inductive phase 24B, and a bypass switch 40 may be interfaced between the nodes for intermediate supply voltage $V_{SUPPLY}'$ and supply voltage $V_{SUPPLY}$.

In the embodiments represented by FIGS. 4 and 5, when battery 22 has insufficient state of charge, it may not be possible to boost from battery 22 at a high enough voltage to match intermediate supply voltage $V_{SUPPLY}'$ generated by power converter 10. Thus, in the case of portable electronic device 1 in which the output of power converter 10 is coupled to the boost output of power converter 20A, the resultant difference in voltages generated by power converter 10 and power converter 20A may cause an uncontrolled current to flow from the charger path (e.g., battery charger 16 and power converter 10).

To overcome this problem, control circuitry 30 may control bypass switch 40 in either a bypass mode or split mode of power converter 20B. In the bypass mode, power converter 20B may operate as a single multiphase buck or boost converter (e.g., in either of the boost mode or buck mode as described above with respect to power converter 20A). In the split mode, which may be activated when battery 22 is low on state of charge, power converter 20B may be effectively split into two separate converters to allow bucking down from intermediate supply voltage $V_{SUPPLY}'$ to battery voltage $V_{BAT}$ (in order to charge battery 22) and then boosting battery voltage $V_{BAT}$ up to at least a minimum voltage level for supply voltage $V_{SUPPLY}$. Thus, power converter 20B may be able to operate in the boost mode in situations in which state of charge of battery 22 is insufficient to support boosting to higher voltages. Operating supply voltage $V_{SUPPLY}$ at a lower voltage may reduce current demands by downstream components 18.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power management system for use in a device comprising a battery and one or more components configured to draw electrical energy from the battery, the power management system comprising:
    a first power converter configured to electrically couple between charging circuitry configured to provide electrical energy for charging the battery and the one or more components; and
    a bidirectional power converter configured to electrically couple between the charging circuitry and the battery, wherein the bidirectional power converter is configured to transfer charge from the battery or transfer charge to the battery based on a power requirement of the one or more components and a power available from the first power converter.

2. The power management system of claim 1, wherein the bidirectional power converter is configured to:
    operate in a first mode to transfer charge to the battery when the power requirement is lesser than the power available from the first power converter; and
    operate in a second mode to transfer charge from the battery when the power requirement is greater than the power available from the first power converter.

3. The power management system of claim 2, wherein the bidirectional power converter is configured to:
operate as a buck converter in the first mode; and
operate as a boost converter in the second mode.

4. A method comprising, in a device comprising a battery and one or more components configured to draw electrical energy from the battery:
receiving electrical energy from charging circuitry configured to provide electrical energy for charging the battery at a first power converter configured to electrically couple between the charging circuitry and the one or more components; and
transferring charge from the battery or transferring charge to the battery, by a bidirectional power converter configured to electrically couple between the charging circuitry and the battery, based on a power requirement of the one or more components and a power available from the first power converter.

5. The method of claim 4, further comprising:
operating the bidirectional power converter in a first mode to transfer charge to the battery when the power requirement is lesser than the power available from the first power converter; and
operating the bidirectional power converter in a second mode to transfer charge from the battery when the power requirement is greater than the power available from the first power converter.

6. The method of claim 5, further comprising:
operating the bidirectional power converter as a buck converter in the first mode; and
operating the bidirectional power converter as a boost converter in the second mode.

7. A device comprising:
a battery;
one or more components configured to draw electrical energy from the battery; and
a power management system comprising:
a first power converter configured to electrically couple between charging circuitry configured to provide electrical energy for charging the battery and the one or more components; and
a bidirectional power converter configured to electrically couple between the charging circuitry and the battery, wherein the bidirectional power converter is configured to transfer charge from the battery or transfer charge to the battery based on a power requirement of the one or more components and a power available from the first power converter.

8. The device of claim 7, wherein the bidirectional power converter is configured to:
operate in a first mode to transfer charge to the battery when the power requirement is lesser than the power available from the first power converter; and
operate in a second mode to transfer charge from the battery when the power requirement is greater than the power available from the first power converter.

9. The device of claim 8, wherein the bidirectional power converter is configured to:
operate as a buck converter in the first mode; and
operate as a boost converter in the second mode.

10. The device of claim 7, wherein the bidirectional power converter is a multiphase power converter.

* * * * *